(12) United States Patent
Noren et al.

(10) Patent No.: US 12,030,197 B2
(45) Date of Patent: Jul. 9, 2024

(54) DELTA ROBOT CALIBRATION METHODS, CONTROL SYSTEM, DELTA ROBOT AND ROBOT SYSTEM

(71) Applicant: ABB Schweiz AG, Baden (CH)

(72) Inventors: Johan Noren, Västerås (SE); Hans Andersson, Västerås (SE); Sven Hanssen, Västerås (SE)

(73) Assignee: ABB Schweiz AG, Baden (CH)

( * ) Notice: Subject to any disclaimer, the term of this patent is extended or adjusted under 35 U.S.C. 154(b) by 433 days.

(21) Appl. No.: 17/427,221

(22) PCT Filed: Feb. 22, 2019

(86) PCT No.: PCT/EP2019/054482
§ 371 (c)(1),
(2) Date: Jul. 30, 2021

(87) PCT Pub. No.: WO2020/169212
PCT Pub. Date: Aug. 27, 2020

(65) Prior Publication Data
US 2022/0097235 A1 Mar. 31, 2022

(51) Int. Cl.
*B25J 9/16* (2006.01)
*B25J 9/00* (2006.01)
*G05B 19/4155* (2006.01)

(52) U.S. Cl.
CPC ........... *B25J 9/1692* (2013.01); *B25J 9/0051* (2013.01); *B25J 9/1623* (2013.01); *G05B 19/4155* (2013.01); *G05B 2219/50391* (2013.01)

(58) Field of Classification Search
CPC ...... B25J 9/1692; B25J 9/0051; B25J 9/1623; G05B 19/4155; G05B 2219/50391
See application file for complete search history.

(56) References Cited

U.S. PATENT DOCUMENTS 6,587,802 B1   7/2003  Schrder et al.
2003/0220756 A1  11/2003  Stengele
(Continued)

FOREIGN PATENT DOCUMENTS

CN   108068115 A   5/2018
EP   1607194 A2   12/2005
(Continued)

OTHER PUBLICATIONS

European Office Action; Application No. 19706624.4; Completed: May 25, 2023; 8 Pages.
(Continued)

*Primary Examiner* — Ian Jen
*Assistant Examiner* — Renee LaRose
(74) *Attorney, Agent, or Firm* — Whitmyer IP Group LLC

(57) ABSTRACT

A method of calibrating a delta robot, the method including executing an arm movement by moving one driving link relative to other two driving links; measuring a movement of a point in fixed relationship with a tilting body during the arm movement as an arm measurement; executing a tilting movement by tilting the tilting body about a fifth axis; measuring a movement of the point during the tilting movement as a tilting measurement; and calibrating a fourth axis based on a comparison of the arm measurement and the tilting measurement. A method of calibrating the fifth axis, a control system, and a robot system are also provided.

19 Claims, 3 Drawing Sheets

(56) References Cited

U.S. PATENT DOCUMENTS

| | | |
|---|---|---|
| 2005/0038563 A1 | 2/2005 | Rauf et al. |
| 2006/0254364 A1 | 11/2006 | Matsushita |
| 2008/0201015 A1* | 8/2008 | Brogardh ............... B25J 9/1692 |
| | | 901/30 |
| 2017/0010094 A1 | 1/2017 | Iseli et al. |
| 2018/0178389 A1* | 6/2018 | Aiso ..................... B25J 9/1692 |
| 2018/0334336 A1 | 11/2018 | Oowatari |

FOREIGN PATENT DOCUMENTS

| | | |
|---|---|---|
| WO | 2014029448 A1 | 2/2014 |
| WO | 2020169212 A1 | 8/2020 |

OTHER PUBLICATIONS

International Preliminary Report on Patentability; Application No. PCT/EP2019/054482; Issued: Aug. 10, 2021; 13 Pages.
International Search Report and Written Opinion of the International Searching Authority; Application No. PCT/EP2019/054482; Completed: Nov. 13, 2019; Mailing Date: Nov. 20, 2019; 17 Pages.

* cited by examiner

DELTA ROBOT CALIBRATION METHODS, CONTROL SYSTEM, DELTA ROBOT AND ROBOT SYSTEM

TECHNICAL FIELD

The present disclosure generally relates to calibration of delta robots. In particular, methods of calibrating a delta robot comprising five axes, a control system for calibrating such delta robot, a delta robot comprising such control system, and a robot system comprising such delta robot and a measurement device, are provided.

BACKGROUND

Industrial robots according to the concept of parallel kinematic robots are previously known. Such robots are mainly used for picking and placing fairly small objects. A delta robot is one type of parallel robot. Delta robots are for example used in the food industry, in the field of surgery and medical science, in the pharmaceutical industry, and in many other fields. Delta robots are for example used for transferring pieces of chocolate or similar objects from a moving conveyor belt to a predetermined location such as in a packaging box, with high speed and precision.

One known way of calibrating a delta robot is to partially disassemble the delta robot by detaching the driven links from the driving links and locking the driving links in defined positions by means of a fixture. However, as the designs of delta robots have become more complex and heavier, it is often complicated, troublesome and time consuming to disassemble the delta robot for calibration. The above type of disassembly also cannot be carried out on some delta robots due to different designs. Furthermore, in case the delta robot comprises more than three axes, also the additional axes need to be calibrated.

WO 2014029448 A1 discloses a jig for calibrating a delta robot. The jig fixes the longitudinal axes of drive arms to be parallel. With this configuration, the jig always fixes the drive arms at the same reference angle no matter what the drive arm length is.

SUMMARY

One object of the present disclosure is to provide a simple method of calibrating a delta robot.

A still further object of the present disclosure is to provide a less time consuming method of calibrating a delta robot.

A still further object of the present disclosure is to provide an accurate method of calibrating a delta robot.

A still further object of the present disclosure is to provide a method of calibrating a delta robot, which method solves several or all of the foregoing objects in combination.

A still further object of the present disclosure is to provide a control system for calibrating a delta robot, which control system solves one, several or all of the foregoing objects.

A still further object of the present disclosure is to provide a delta robot comprising a control system, which delta robot solves one, several or all of the foregoing objects.

A still further object of the present disclosure is to provide a robot system comprising a delta robot and a measurement device, which robot system solves one, several or all of the foregoing objects.

According to one aspect, there is provided a method of calibrating a delta robot, the delta robot comprising a base; a translation body; three parallel manipulator arms connected between the base and the translation body, each manipulator arm comprising a driving link and a driven link, and the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the method comprises executing an arm movement by moving one of the driving links relative to the other two driving links; measuring a movement of a point in fixed relationship with the tilting body during the arm movement as an arm measurement; executing a tilting movement by tilting the tilting body about the fifth axis; measuring a movement of the point during the tilting movement as a tilting measurement; and calibrating the fourth axis based on a comparison of the arm measurement and the tilting measurement.

The driving links of the manipulator arms provide the first three axes of the delta robot. Each driving link may be independently driven by an actuator, such as an electric motor. Each manipulator arm may comprise one driven link, or a pair of driven links, between the driving link and the translation body. The driven links may be connected to the each of the translation body and an associated driving link via ball joints.

The delta robot may further comprise a telescoping rotation shaft for controlling rotation of the rotation body about the fourth axis and a telescopic tilting shaft for controlling tilting of the tilting body about the fifth axis.

During the arm movement, the fourth axis and the fifth axis may be locked. During the tilting movement, the first three axes and the fourth axis may be locked.

If the fourth axis would be perfectly calibrated, the tilting measurement of the point would be as expected in relation to the arm measurement of the point, e.g. a projection of the arm movement in a projection plane would be parallel with a projection of the tilting movement in the projection plane. However, due to kinematic errors and/or imperfect calibration, positioning errors may occur in the delta robot. Errors in the fourth axis will be manifested in an angular deviation other than expected (e.g. non-zero), between the arm movement and the tilting movement. By utilizing this deviation in a five axis delta robot, the method enables a simple and accurate calibration of the fourth axis by looking for parallelism (or any other arbitrarily defined relationship) between one of the driving links and the tilting body.

According to one variant, the method comprises calibrating the fourth axis based on a value indicative of a degree of parallelism between the arm measurement and the tilting measurement.

The arm measurement and the tilting measurement may be made by means of a measurement device according to the present disclosure, for example a laser measurement device. The measurement device may measure either absolute movements, or relative movements, of the arm movement and the tilting movement. In any case, the measurements can be made in an arbitrary coordinate system.

The method may further comprise executing a movement of the delta robot after calibrating the fourth axis.

The method may further comprise commanding positioning of the tilting body, such that the fifth axis is parallel with an axis of one of the driving links (i.e. one of the first three axes), prior to the tilting movement. In case there is an error in the fourth axis, the fifth axis will not be positioned perfectly parallel with the one axis of the driving links. However, this error will then be calibrated by the method. This commanding may optionally be done prior to the arm movement. In this case, the comparison may comprise a determination of a degree of parallelism (e.g. a deviation from parallelism) between the relatively moved driving link and the fifth axis. As an alternative, the method may further comprise commanding positioning of the tilting body such that the fifth axis adopts any definable relationship (i.e. not necessarily parallel) with an axis of one of the driving links.

The point in fixed relationship with the tilting body may be a tool center point (TCP). However, alternative points may be used, such as a reference mark on a visible area of the tilting body, or on an end effector attached to the tilting body.

The arm movement may comprise moving one of the driving links while keeping the other two driving links stationary. Alternatively, the arm movement may comprise moving a first and a second driving link simultaneously while keeping a third driving link stationary. Also in this manner, one driving link (the third driving link) will be moved relative to the other two driving links (the first and second driving links).

The arm measurement may comprise measuring the movement of the point as a projection in a projection plane, and the tilting measurement may comprise measuring the movement of the point as a projection in the projection plane. By measuring movements of the point in the projection plane, the calibration error in the fourth axis can be determined as corresponding to an angle between two lines in the projection plane. Thereby, a simpler measurement device can be used, such as a camera or other two-dimensional measurement device. The projection plane may be substantially perpendicular to, or perpendicular to, the fourth axis. In this case, each projection of the point of the arm movement and the tilting movement will be a straight, or substantially straight, line.

As an alternative, the arm measurement may comprise determining a plane in which the point moves during the arm movement as an arm movement plane, determining a plane in which the point moves during the tilting movement as a tilting movement plane, and calibrating the fourth axis based on a comparison of the arm movement plane and the tilting movement plane. For example, a difference between the normal of each of the arm movement plane and the tilting movement plane may be determined, and the calibration of the fourth axis may be made based on this difference.

According to a further aspect, there is provided a method of calibrating a delta robot, the delta robot comprising a base; a translation body; three parallel manipulator arms connected between the base and the translation body, each manipulator arm comprising a driving link and a driven link, and the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the method comprises measuring a position of a tilting body plane in fixed relationship with the tilting body as a first plane measurement in a first position of the tilting body; rotating the rotation body about the fourth axis such that the tilting body moves from the first position to a second position; measuring a position of the tilting body plane in the second position of the tilting body as a second plane measurement; and calibrating the fifth axis based on a comparison of the first plane measurement and the second plane measurement.

If the fifth axis would be perfectly calibrated, the first plane measurement would be as expected in relation to the second plane measurement, e.g. the tilting body plane in the first plane measurement would be parallel with the tilting body plane in the second measurement. In this case, the tilting body plane would not wobble at all during rotation of the rotation body about the fourth axis. However, due to kinematic errors and/or imperfect calibration, positioning errors may occur in the delta robot. Errors in the fifth axis will be manifested in an angular deviation other than expected (e.g. non-parallel), between the first plane measurement and the second plane measurement. Thus, the tilting body plane will wobble slightly and/or represent an imperfect cone when the rotation body rotates about the fourth axis. By utilizing this deviation in a five axis delta robot, the method enables a simple and accurate calibration of the fifth axis by looking for parallelism (or any other arbitrarily defined relationship) between the tilting body plane in the first plane measurement and the tilting body plane in the second plane measurement.

The tilting body plane may for example be constituted by a mounting flange, or other flat surface, of the tilting body. The angular distance of rotation of the rotation body about the fourth axis such that the tilting body moves from the first position to the second position may be arbitrarily, such as 180 degrees.

According to one variant, only the rotation body is moved in order to move the tilting body from the first position to the second position. That is, the first three axes and the fifth axis may be locked during the movement of the tilting body from the first position to the second position.

According to one variant, the method comprises calibrating the fifth axis based on a value indicative of a degree of parallelism between the first plane measurement and the second plane measurement.

The first plane measurement and the second plane measurement may be made by means of a measurement device according to the present disclosure, for example a laser measurement device. The measurement device may measure either absolute positions, or relative positions, of the tilting body plane in the respective first position and second position of the tilting body. In any case, the measurements of relative positions of the tilting body plane can be made in an arbitrary coordinate system.

The method may further comprise executing a movement of the delta robot after calibrating the fifth axis.

The method may further comprise commanding positioning of the tilting body in a zero position prior to the first plane measurement, wherein the tilting body plane is positioned perpendicular to the fourth axis in the zero position. In case there is an error in the fifth axis, the tilting body plane will not be positioned perfectly perpendicular to the fourth axis. However, this error will then be calibrated by the method.

The method may further comprise determining an angle difference between the tilting body plane in the first position and the tilting body plane in the second position, and calibrating the fifth axis based on the angle difference.

The calibration may further be based on an angular distance about the fourth axis of the rotation body that causes movement of the tilting body from the first position to the second position.

According to a further aspect, there is provided a control system for calibrating a delta robot, the delta robot comprising a base; a translation body; three parallel manipulator arms connected between the base and the translation body, each manipulator arm comprising a driving link and a driven link, and the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the control system comprises a data processing device and a memory having a computer program stored thereon, the computer program comprising program code which, when executed by the data processing device causes the data processing device to perform the steps of commanding execution of an arm movement by moving one of the driving links relative to the other two driving links; commanding measurement of a movement of a point in fixed relationship with the tilting body during the arm movement as an arm measurement; commanding execution of a tilting movement by tilting the tilting body about the fifth axis; commanding measurement of a movement of the point during the tilting movement as a tilting measurement; and calibrating the fourth axis based on a comparison of the arm measurement and the tilting measurement. The computer program may further comprise program code which, when executed by the data processing device causes the data processing device to perform, or command execution of, any step according to the present disclosure.

According to a further aspect, there is provided a control system for calibrating a delta robot, the delta robot comprising a base; a translation body; three parallel manipulator arms connected between the base and the translation body; the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the control system comprises a data processing device and a memory having a computer program stored thereon, the computer program comprising program code which, when executed by the data processing device causes the data processing device to perform the steps of commanding a measurement of a tilting body plane in fixed relationship with the tilting body as a first plane measurement in a first position of the tilting body; commanding rotation of the rotation body about the fourth axis such that the tilting body moves from the first position to a second position; commanding a measurement of the tilting body plane in the second position of the tilting body as a second plane measurement; and calibrating the fifth axis based on a comparison of the first plane measurement and the second plane measurement. The computer program may further comprise program code which, when executed by the data processing device causes the data processing device to perform, or command execution of, any step according to the present disclosure.

According to a further aspect, there is provided a delta robot comprising a base; a translation body; three parallel manipulator arms connected between the base and the translation body, each manipulator arm comprising a driving link and a driven link, and the manipulator arms being arranged to translate the translation body in three axes; a rotation body arranged to rotate relative to the translation body about a fourth axis; a tilting body connected to the rotation body and arranged to tilt relative to the rotation body about a fifth axis; and a control system according to the present disclosure.

According to a further aspect, there is provided a robot system comprising a delta robot according to the present disclosure and a measurement device configured to measure a movement of the point in fixed relationship with the tilting body and/or configured to measure a tilting body plane in fixed relationship with the tilting body.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
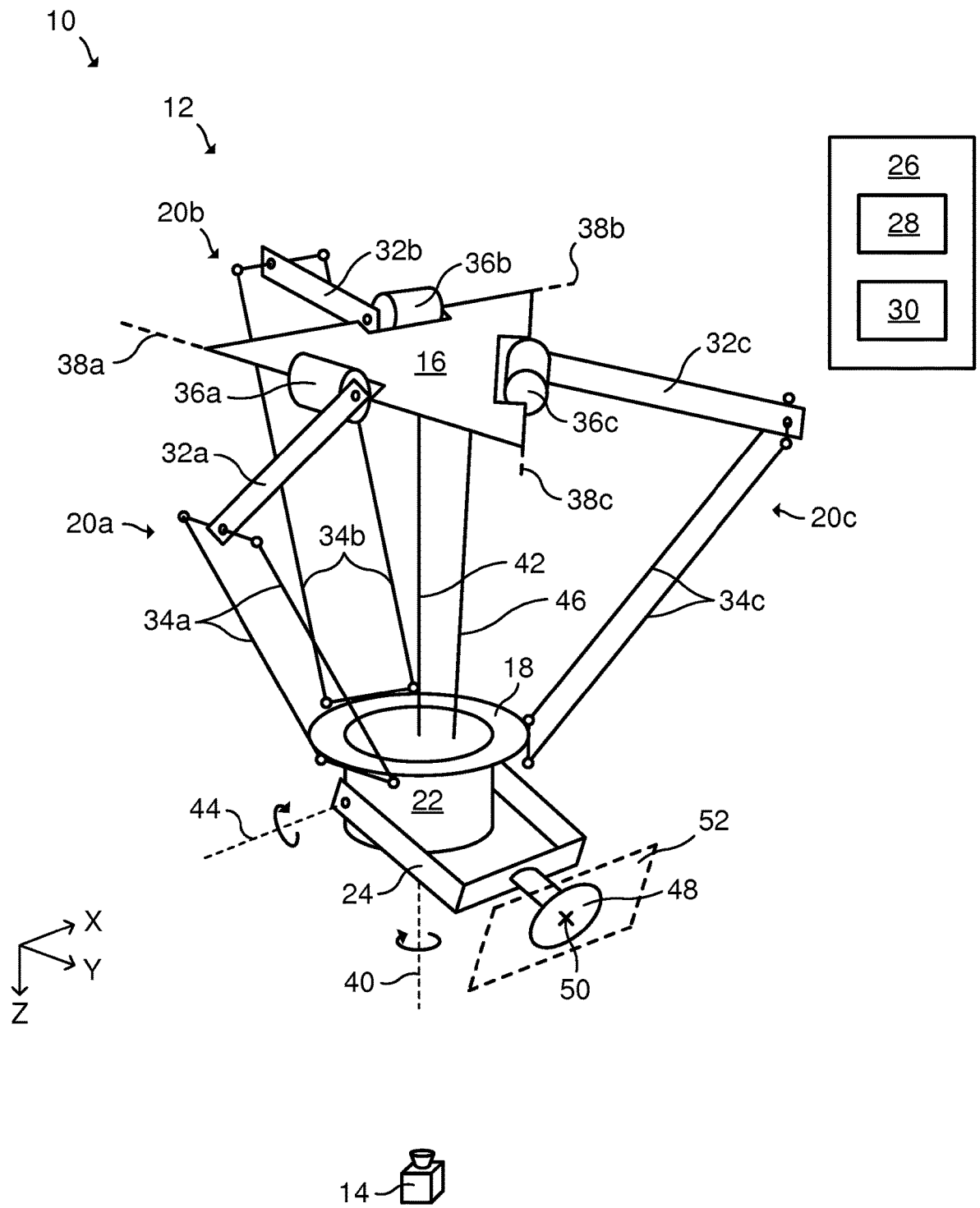
FIG. 1: schematically represents a perspective view of a robot system comprising a delta robot and a measurement device.

In the following, methods of calibrating a delta robot comprising five axes, a control system for calibrating such delta robot, a delta robot comprising such control system, and a robot system comprising such delta robot and a measurement device, will be described. The same reference numerals will be used to denote the same or similar structural features.

FIG. 1 schematically represents a perspective view of a robot system 10 comprising a delta robot 12 and a measurement device 14. The delta robot 12 comprises a base 16, a translation body 18, three parallel manipulator arms 20*a*, 20*b*, 20*c*, a rotation body 22 and a tilting body 24. FIG. 1 further shows a Cartesian coordinate system X, Y, Z for referencing purposes.

The delta robot 12 further comprises a control system 26. The control system 26 controls operations of the delta robot 12. In this example, the control system 26 also controls operations of the measurement device 14. The control system 26 comprises a data processing device 28 and a memory 30. A computer program is stored in the memory 30. The computer program comprises program code which, when executed by the data processing device 28 causes the data processing device 28 to perform, or command execution of, any step as described herein.

In the example in FIG. 1, each manipulator arm 20*a*, 20*b*, 20*c* comprises a driving link 32*a*, 32*b*, 32*c* and a pair of driven links 34*a*, 34*b*, 34*c*. Each driven link 34*a*, 34*b*, 34*c* is connected to each of an associated driving link 32*a*, 32*b*, 32*c* and to the translation body 18 via ball joints (not denoted). The driven links 34*a*, 34*b*, 34*c* are here constituted by rigid rods.

The delta robot 12 further comprises three actuators 36*a*, 36*b*, 36*c* for independently driving a respective driving link 32*a*, 32*b*, 32*c*. In this example, each actuator 36*a*, 36*b*, 36*c* is an electric motor. The first actuator 36*a* is arranged to drive the first driving link 32*a* for rotation about a first axis 38*a*. The second actuator 36*b* is arranged to drive the second driving link 32*b* for rotation about a second axis 38*b*. The third actuator 36*c* is arranged to drive the third driving link 32*c* for rotation about a third axis 38*c*. Each driven link 34*a*, 34*b*, 34*c* follows the movements of the associated driving link 32*a*, 32*b*, 32*c* and thereby causes movement of the translation body 18.

The delta robot 12 is a type of parallel robot. The manipulator arms 20*a*, 20*b*, 20*c* form multiple kinematic chains connecting the base 16 with the translation body 18.

The manipulator arms 20a, 20b, 20c restrict the movement of the translation body 18 to pure translation, i.e. only movement in the X, Y or Z direction with no rotation.

The rotation body 22 is rotationally coupled with the translation body 18. In this example, rotation body 22 is arranged within the translation body 18. The rotation body 22 can be rotated relative to the translation body 18 about a fourth axis 40. As shown in FIG. 1, the delta robot 12 of this example comprises a telescopic rotation shaft 42 for controlling rotation of the rotation body 22 relative to the translation body 18 about the fourth axis 40.

The tilting body 24 is rotationally coupled with the rotation body 22. The tilting body 24 can be tilted relative to the rotation body 22 about a fifth axis 44. As shown in FIG. 1, the delta robot 12 of this example comprises a telescopic tilting shaft 46 for controlling tilting of the tilting body 24 relative to the rotation body 22 about the fifth axis 44. The tilting body 24 of this example has the shape of a bracket.

The delta robot 12 further comprises an end effector 48. The end effector 48 is here exemplified as a suction gripper with a generally flat surface. The end effector 48 is rigidly attached to the tilting body 24.

In FIG. 1, a point 50 is denoted on the end effector 48. The point 50 is used for calibration of the delta robot 12, as will be described in the following. In this example, the point 50 is constituted by a tool center point of the end effector 48. However, a point 50 alternatively positioned in fixed relationship with respect to the tilting body 24 may also be used.

FIG. 1 further denotes a tilting body plane 52 of the tilting body 24. The tilting body plane 52 is used for calibration of the delta robot 12, as will be described in the following. In this example, the tilting body plane 52 is aligned with the flat surface of the end effector 48. However, a tilting body plane 52 alternatively positioned in fixed relationship with respect to the tilting body 24 may also be used.

The measurement device 14 is arranged to measure movements of the point 50. The measurement device 14 is also arranged to measure positions of the tilting body plane 52. In this example, the measurement device 14 is a laser measurement device configured to measure absolute movements of the point 50 and absolute positions of the tilting body plane 52.

Figure 2:
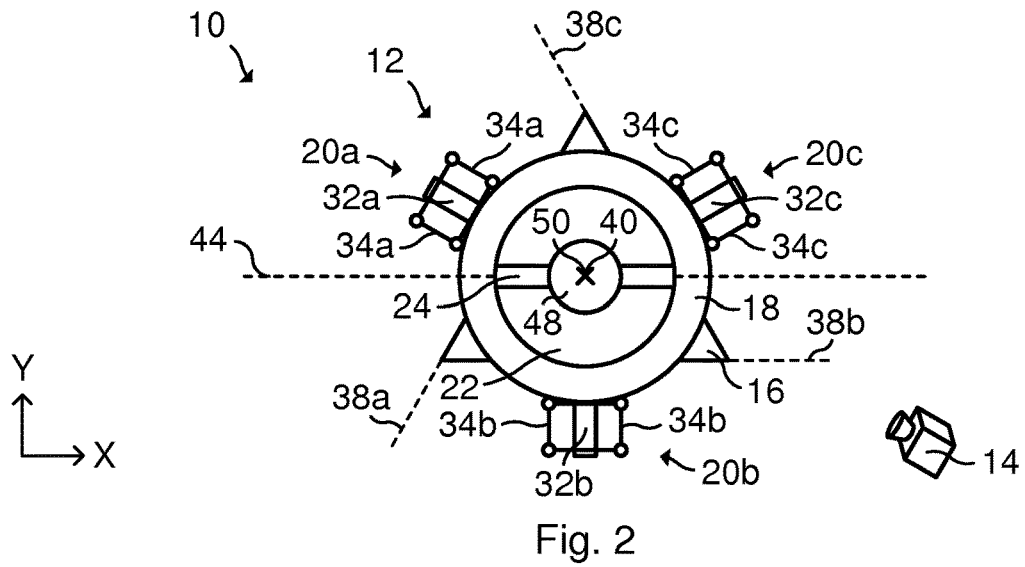
FIG. 2: schematically represents a bottom view of the delta robot in a starting position.

FIG. 2 schematically represents a bottom view of the delta robot 12 in a starting position. A method of calibrating the fourth axis 40 will now be described.

In this example, the fifth axis 44 is first commanded to be positioned parallel with the second axis 38b by rotating the rotation body 22 about the fourth axis 40. An arm movement is then executed by moving the second driving link 32b. In this example of the arm movement, the first driving link 32a and the third driving link 32c are stationary, the rotation body 22 is locked against rotation about the fourth axis 40 and the tilting body 24 is locked against rotation about the fifth axis 44. During the arm movement, a relative movement between the second driving link 32b and the first and third driving links 32a, 32c takes place.

Figure 3:
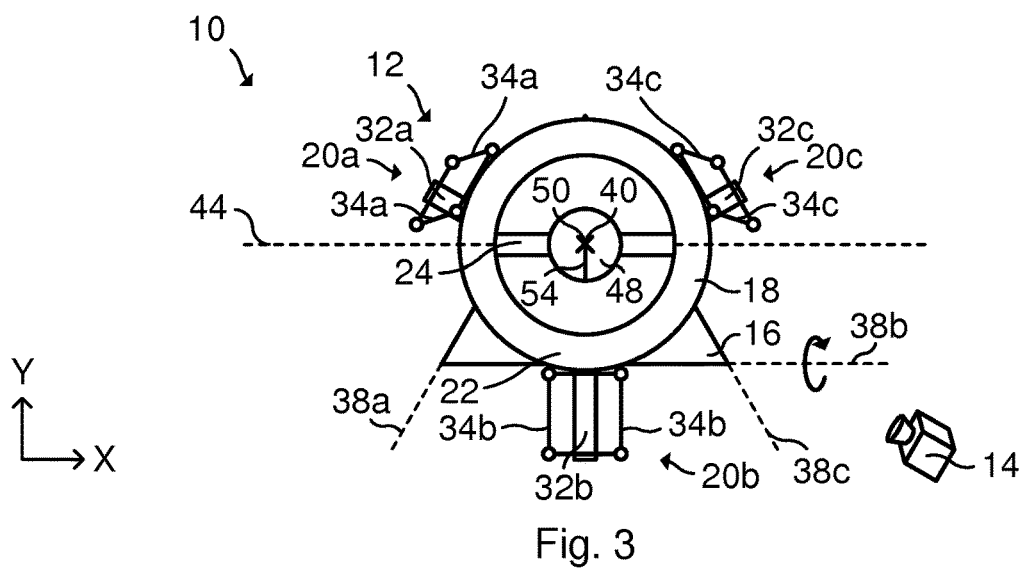
FIG. 3: schematically represents a bottom view of the delta robot after execution of an arm movement.

FIG. 3 schematically represents a bottom view of the delta robot 12 after execution of the arm movement 54. After the arm movement 54, the point 50 in fixed relationship with the tilting body 24 has moved from the starting position in FIG. 2 to the position in FIG. 3, as illustrated with the straight line 54 in FIG. 3. A projection of the arm movement 54 in the XY-plane is linear, but the arm movement 54 is not linear in space. In this example, the arm movement 54 is slightly curved in a plane parallel with the YZ-plane. A linear projection of the arm movement 54 in the XY-plane is detected by the measurement device 14 and recorded by the control system 26 as an arm measurement.

In this example, the delta robot 12 is then returned to the starting position according to FIG. 2. A tilting movement is then executed by tilting the tilting body 24 about the fifth axis 44. In this example of the tilting movement, each of the three driving links 32a, 32b, 32c is stationary and the rotation body 22 is locked against rotation about the fourth axis 40.

Figure 4:
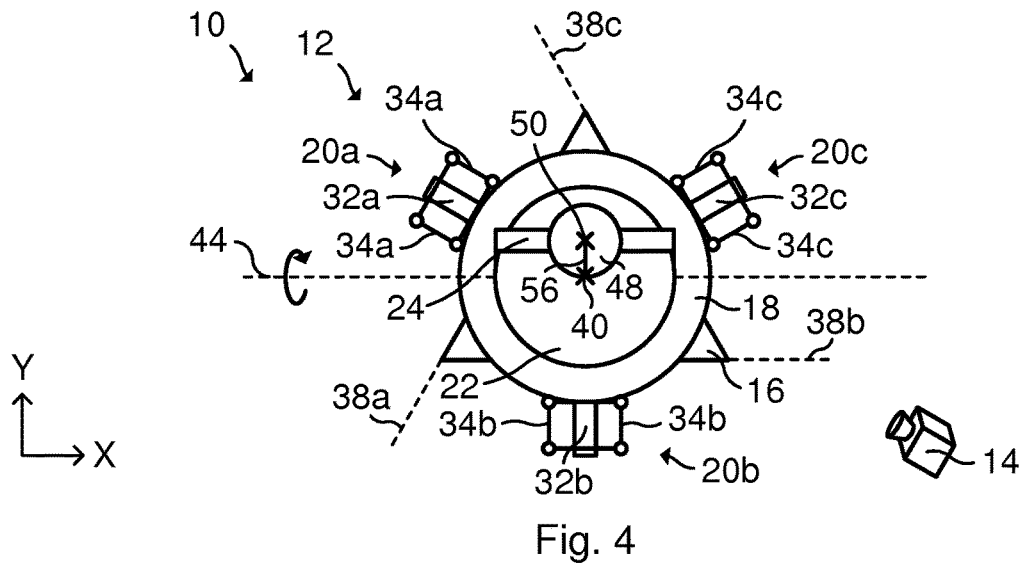
FIG. 4: schematically represents a bottom view of the delta robot after execution of a tilting movement.

FIG. 4 schematically represents a bottom view of the delta robot 12 after execution of the tilting movement 56. As shown in FIG. 4, the point 50 in fixed relationship with the tilting body 24 has moved linearly in the XY-plane from the starting position in FIG. 2 to the position in FIG. 4. A linear projection of the tilting movement 56 is detected by the measurement device 14 and recorded by the control system 26 as a tilting measurement. The tilting movement 56 in space is however not linear.

If the fourth axis 40 is well calibrated, the linear projections in the XY-plane of the arm movement 54 and the tilting movement 56 will be parallel. However, if the fourth axis 40 is incorrectly calibrated, the linear projections in the XY-plane of the arm movement 54 and the tilting movement 56 will not be parallel. An angle between the linear projections is then calculated and the fourth axis 40 is recalibrated based on this angle.

As an alternative to the use of linear projections, the arm measurement may comprise determining a plane in which the point 50 moves during the arm movement 54 as an arm movement plane, determining a plane in which the point 50 moves during the tilting movement 56 as a tilting movement plane, and calibrating the fourth axis 40 based on a comparison of the arm movement plane and the tilting movement plane. For example, a difference between the normal of each of the arm movement plane and the tilting movement plane may be determined, and the calibration of the fourth axis 40 can be made based on this difference.

Figure 5:
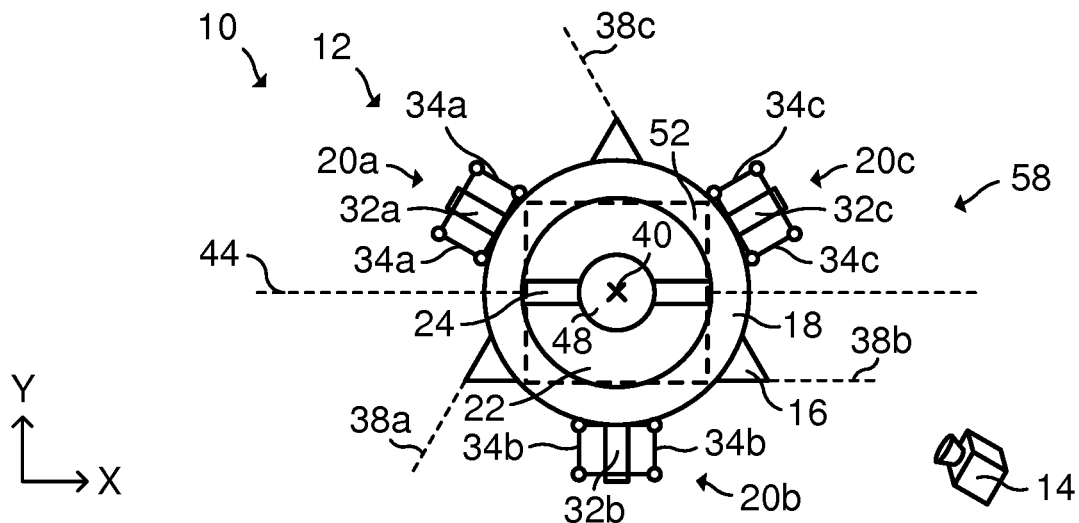
FIG. 5: schematically represents a bottom view of the delta robot with a tilting body in a first position.

FIG. 5 schematically represents a bottom view of the delta robot 12 when the tilting body 24 has adopted a first position 58. A method of calibrating the fifth axis 44 will now be described.

In this example, the tilting body 24 is commanded to be positioned in a zero position as the first position 58. In the zero position, the tilting body plane 52 is positioned perpendicular to the fourth axis 40 if the fifth axis 44 is well calibrated.

A position of the tilting body plane 52 in the first position 58 of the tilting body 24 is then measured by the measurement device 14. The first position 58 of the tilting body plane 52 is recorded by the control system 26 as a first plane measurement. The rotation body 22 is then rotated about the fourth axis 40. By this rotation, the tilting body 24 moves from the first position 58 to a second position.

Figure 6:
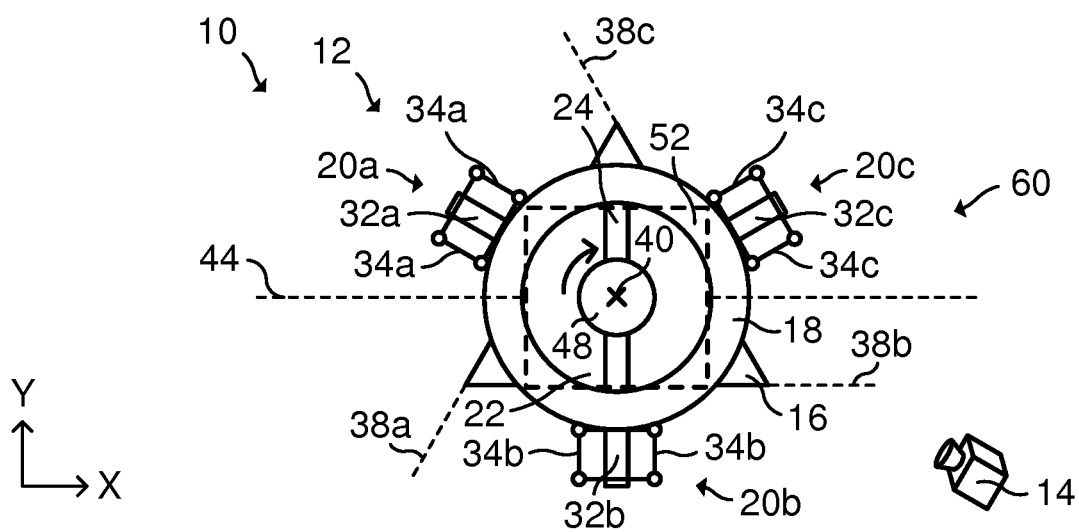
FIG. 6: schematically represents a bottom view of the delta robot with the tilting body in a second position.

FIG. 6 schematically represents a bottom view of the delta robot 12 with the tilting body 24 in the second position 60. In this example, rotation body 22 is rotated 90 degrees about the fourth axis 40 between the first position 58 in FIG. 5 and the second position 60 in FIG. 6. During this rotation, the three driving links 32a, 32b, 32c are stationary and the tilting body 24 is locked against rotation of about the fifth axis 44.

The second position 60 of the tilting body plane 52 is recorded by the control system 26 as a second plane measurement. If the fifth axis 24 is well calibrated, the tilting body plane 52 in the first position 58 of the tilting body 24 will be parallel with the tilting body plane 52 in the second position 60 of the tilting body 24. However, if the fifth axis 44 is incorrectly calibrated, the first plane measurement and the second plane measurement will not be parallel. In this case, the tilting body plane 52 will wobble as the tilting body 24 is rotated about the fourth axis 40. An angle between the tilting body plane 52 according to the first plane measurement and the tilting body plane 52 according to the second plane measurement is then calculated. The fifth axis 44 is then recalibrated based on this angle and optionally also based on the angular distance of rotation of the rotation body 22 about the fourth axis 40 between the first position 58 and the second position 60.

While the present disclosure has been described with reference to exemplary embodiments, it will be appreciated that the present invention is not limited to what has been described above. For example, it will be appreciated that the dimensions of the parts may be varied as needed.

The invention claimed is:

1. A method of calibrating a delta robot, the delta robot comprising:
   a base;
   a translation body;
   three parallel manipulator arms connected between the base and the translation body, each manipulator arm including a driving link and a driven link, and the manipulator arms being arranged to translate the translation body in three axes;
   a rotation body arranged to rotate relative to the translation body about a fourth axis; and
   a tilting body connected to the rotation body and arranged to tilt relative to the rotation body about a fifth axis;
   wherein the method comprises:
      executing an arm movement by moving one of the driving links relative to the other two driving links;
      measuring a movement of a point in fixed relationship with the tilting body during the arm movement as an arm measurement;
      executing a tilting movement by tilting the tilting body about the fifth axis;
      measuring a movement of the point during the tilting movement as a tilting measurement; and
      calibrating the fourth axis based on a comparison of the arm measurement and the tilting measurement.

2. The method according to claim 1, further comprising commanding positioning of the tilting body, such that the fifth axis is parallel with an axis of one of the driving links, prior to the tilting movement.

3. The method according to claim 1, wherein the point is a tool center point.

4. The method according to claim 1, wherein the arm movement comprises moving one of the driving links while keeping the other two driving links stationary.

5. The method according to claim 1, wherein the arm measurement comprises measuring the movement of the point as a projection in a plane, and wherein the tilting measurement includes measuring the movement of the point as a projection in the plane.

6. The method of calibrating a delta robot, the delta robot comprising:
   a base;
   a translation body;
   three parallel manipulator arms connected between the base and the translation body, each manipulator arm including a driving link and a driven link, and the manipulator arms being arranged to translate the translation body in three axes;
   a rotation body arranged to rotate relative to the translation body about a fourth axis; and
   a tilting body connected to the rotation body and arranged to tilt relative to the rotation body about a fifth axis;
   wherein the method comprises:
      measuring a position of a tilting body plane in fixed relationship with the tilting body as a first plane measurement in a first position of the tilting body;
      rotating the rotation body about the fourth axis such that the tilting body moves from the first position to a second position;
      measuring a position of the tilting body plane in the second position of the tilting body as a second plane measurement; and
      calibrating the fifth axis based on a comparison of the first plane measurement and the second plane measurement.

7. The method according to claim 6, further comprising commanding positioning of the tilting body in a zero position prior to the first plane measurement, wherein the tilting body plane is positioned perpendicular to the fourth axis in the zero position.

8. The method according to claim 6, further comprising determining an angle difference between the tilting body plane in the first position and the tilting body plane in the second position, and calibrating the fifth axis based on the angle difference.

9. The method according to claim 6, wherein the calibration is further based on an angular distance about the fourth axis of the rotation body that causes movement of the tilting body from the first position to the second position.

10. A control system for calibrating a delta robot, the delta robot comprising a base; a translation body; three parallel manipulator arms connected between the base and the translation body, each manipulator arm including a driving link and a driven link, and the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the control system comprises a data processing device and a memory having a computer program stored thereon, the computer program including program code which, when executed by the data processing device causes the data processing device to perform the steps of:
   commanding execution of an arm movement by moving one of the driving links relative to the other two driving links;
   commanding measurement of a movement of a point in fixed relationship with the tilting body during the arm movement as an arm measurement;
   commanding execution of a tilting movement by tilting the tilting body about the fifth axis;
   commanding measurement of a movement of the point during the tilting movement as a tilting measurement; and
   calibrating the fourth axis based on a comparison of the arm measurement and the tilting measurement.

11. A control system for calibrating a delta robot, the delta robot comprising a base; a translation body; three parallel manipulator arms connected between the base and the translation body; the manipulator arms being arranged to translate the translation body in three axes; a rotation body arranged to rotate relative to the translation body about a fourth axis; and a tilting body connected to the rotation body and arranged to tilt relative to the rotation body about a fifth axis; wherein the control system comprises a data processing device and a memory having a computer program stored thereon, the computer program including program code which, when executed by the data processing device causes the data processing device to perform the steps of:

commanding a measurement of a tilting body plane in fixed relationship with the tilting body as a first plane measurement in a first position of the tilting body;

commanding rotation of the rotation body about the fourth axis such that the tilting body moves from the first position to a second position;

commanding a measurement of the tilting body plane in the second position of the tilting body as a second plane measurement; and calibrating the fifth axis based on a comparison of the first plane measurement and the second plane measurement.

12. A delta robot comprising:
a base;
a translation body;
three parallel manipulator arms connected between the base and the translation body, each manipulator arm including a driving link and a driven link, and the manipulator arms being arranged to translate the translation body in three axes;
a rotation body arranged to rotate relative to the translation body about a fourth axis;
a tilting body connected to the rotation body and arranged to tilt relative to the rotation body about a fifth axis; and
a control system according to claim 10.

13. A robot system comprising a delta robot according to claim 12 and a measurement device configured to measure a movement of the point in fixed relationship with the tilting body and/or configured to measure a tilting body plane in fixed relationship with the tilting body.

14. The robot system according to claim 13, wherein the measurement device is a laser measurement device.

15. The method according to claim 2, wherein the point is a tool center point.

16. The method according to claim 2, wherein the arm movement comprises moving one of the driving links while keeping the other two driving links stationary.

17. The method according to claim 2, wherein the arm measurement comprises measuring the movement of the point as a projection in a plane, and wherein the tilting measurement includes measuring the movement of the point as a projection in the plane.

18. The method according to claim 7, further comprising determining an angle difference between the tilting body plane in the first position and the tilting body plane in the second position, and calibrating the fifth axis based on the angle difference.

19. The method according to claim 7, wherein the calibration is further based on an angular distance about the fourth axis of the rotation body that causes movement of the tilting body from the first position to the second position.

* * * * *